United States Patent Office 3,086,946
Patented Apr. 23, 1963

3,086,946
FLUOROAMIDINES AND CONDENSATION PRODUCTS THEREOF
Henry C. Brown, Gainesville, Fla., assignor to Research Corporation, New York, N.Y., a corporation of New York
No Drawing. Filed June 6, 1960, Ser. No. 33,900
25 Claims. (Cl. 260—2)

This invention relates to new perfluoroalkyl imidines and diamidines and their condensation products.

The new perfluoroalkyl imidines and diamidines of the invention may be obtained in practically quantitative yield by refluxing the dinitriles of perfluoroalkanedicarboxylic acids of the formula $$NC(CF_2)_nCN$$

wherein $n$ is an integer from 1 to 10 with liquid ammonia.

When $n$ in the formula $NC(CF_2)_nCN$ is less than 4, imidines of the formula

[structure: ring with NH, (CF$_2$)$_{n'}$, C, NH, C, NH]

wherein $n'$ is an integer from 1 to 3, are formed. These imidines may also exist in the tautomeric form

[structure: ring with NH$_2$, (CF$_2$)$_{n'}$, N, C, NH]

When $n$ in the formula $NC(CF_2)_nCN$ is 4 or more, diamidines of the formula $$H_2N(NH:)C(CF_2)_{n''}C(:NH)NH_2$$

wherein $n''$ is an integer from 4 to 10, are formed.

The $(CF_2)_{n'}$ and $_{n''}$ chains as represented above are intended to include the isomeric branched structures wherein one or more of the fluorine atoms is substituted by a perfluoroalkyl group, as represented for example by the compound perfluoroethyladiponitrile, $$NC.C_4F_7(C_2F_5).NC$$

and its corresponding diamidine.

It has been found that these imidines and diamidines undergo condensation with elimination of ammonia on heating to give heat stable high molecular weight polymers. They also undergo condensation with other reactive substances to give useful products. Particularly useful are the elastomeric condensation products which can be obtained by heating the perfluoroalkyl imidines and diamidines of the invention with perfluoroalkylmonoamidines of the formula $$CF_3(CF_2)_nC(:NH)NH_2$$

particularly those wherein $n$ is an integer from 0 to 10.

The physical properties of the polymeric products, particularly their insolubility, infusibility and hardness, together with their infrared spectra indicate that they contain crosslinked chains of triazine rings which may be generally represented as follows:

[structure of crosslinked triazine ring network with (CF$_2$)$_n$ linkages]

In the case of the products obtained by copolymerization of the imidines or diamidines with perfluoroalkylamidines, terminal groups will be attached to one of the carbon of a proportion of the triazine rings depending on the ratio of the reactants. The structure of the copolymers may be represented as follows:

[structure of copolymer with (CF$_2$)$_n$ linkages and CF$_3$ terminal groups]

The condensation products of the invention therefore may be defined as having the basic structure $$\left[ \begin{array}{c} (CF_2)_n \\ | \\ C \\ N \diagup \diagdown N \\ -(CF_2)_n - C \diagdown \diagup C - (CF_2)_n - \\ N \end{array} \right]_m$$

wherein $n$ is an integer from 1 to 10 and $m$ is an integer greater than 1.

Condensation products having a similar structure and properties may also be obtained by heating perfluoroalkanoyl dinitriles of the general formula $NC(C_nF_{2n})CN$, wherein $n$ is 1 to 10, in the presence of ammonia, alkylamines and other Lewis-base type catalysts and also in the presence of some acidic catalysts such as aluminum chloride and boron trifluoride, either alone or in the presence of perfluoroalkanoyl nitriles.

The method of making the imidines and diamidines of the invention is illustrated by the following examples:

*Example 1.—Perfluoroglutarimidine*

56 gms. of perfluoroglutarodinitrile is condensed in 300 ml. flask that has been previously attached to a vacuum system and evacuated. A Dry-Ice cooled condenser attached to this flask is arranged to provide reflux condensation. Approximately 150 ml. of liquid ammonia is condensed in the flask, the system opened to a nitrogen sweep, and the ammonia-perfluorodinitrile mixture allowed to warm to the reflux temperature of ammonia. Reflux is continued for 1 hour; cooling is then discontinued at the condenser and the excess ammonia allowed to escape through the nitrogen sweep. Last traces of ammonia are removed by reconnecting the flask containing the reaction product to the vacuum pump and holding at a pressure less than 1 mm. for 1–2 hours. The resulting product is perfluoroglutarimidine, white solid, melting with evolution of ammonia and polymerization in the range of 147–157° C. (sealed tube). The yield of the perfluoroimidine is quantitative.

*Example 2.—Perfluoroadipodiamidine*

When perfluoroadipodinitrile is reacted with liquid ammonia in the apparatus of Example 1, a quantitative yield of perfluoroadipodiamidine is obtained as a white solid, melting with the evolution of ammonia and polymerization in the range 125–135° C. (sealed tube).

The diamidines of the invention may be converted to high molecular weight resinous condensation products of high heat stability and resistance to chemical attack. Polymeric materials formed from fluorocarbon olefins and fluorochlorocarbon olefins have been of great practical use due to their chemical inertness and considerable thermal stability. However, these polymers, formed by an addition reaction involving the reaction of a C—C double bond to produce other C—C bonds, have a tendency to undergo a reverse reaction at elevated temperatures which is, in effect, a depolymerization process, and results in a degradation of the polymer to its original constituents or lower molecular weight fragments. Since the condensation products of the invention are produced by elimination of one or more of the products of the reaction they are not subject to the reverse reaction to produce the original monomer. The new condensation products are useful in the fabrication of mechanical and electronic parts for operation at elevated temperatures under conditions of severe corrosiveness.

The following is an example of the preparation of the monocondensation products of the invention:

*Example 3*

The perfluoroadipodiamidine

$H_2N(HN)C(CF_2)_4C(NH)NH_2$ of Example 2 was heated in an open vessel. At about 125° C. the compound melted; slow evolution of ammonia began at 130° and ammonia evolution was vigorous at 150–155°. At 165° the reaction product had set to a transparent pale yellow resin. The product of this reaction was heated to 400° C. in an open tube with no apparent change after 30 minutes at this temperature. Heating to 540° C. on a copper-nickel block caused no charring or change in appearance. The product was boiled with concentrated nitric acid; the color was somewhat lighter but no other change was apparent.

By heating together the imidines and diamidines of the invention with perfluoroalkylmonoamidines thermally stable, acid resistant high molecular weight elastomeric condensation products are obtained. Although many elastomeric substances have been synthesized from hydrocarbon derivatives and few are known that contain fluorocarbon groups, the degree of thermal stability and resistance to solvents and acids that is desired for specialized uses has not yet been attained.

The properties of the elastomeric condensation products of the invention may be varied over a wide range by the use of imidines, diamidines and mono amidines containing fluorocarbon chains of different lengths and by varying the molar ratio of the reactants. The properties of the materials may also be varied by the addition of various filling materials and curing agents to the condensation products. In general, the elastomeric condensation products of the invention are useful in the fabrication of such articles as gaskets, hydraulic seals, flexible hose and the like that must operate at high temperatures and under conditions of severe acid corrosiveness.

The following examples are illustrative of the production of the elastomeric intercondensation products of the invention:

*Example 4.—Intercondensations of Perfluoroalkyl Imidines and Diamidines with Perfluoroalkylmonoamidines*

(a) *Apparatus.*—Intercondensations were carried out in a cylindrical reactor constructed from 41 mm. O.D. Pyrex tubing. The reactor was 90 mm. high and surmounted by a 45/50 female joint. A water-cooled cold-finger type condenser, 32 mm. O.D., projected into the reactor to a distance of 30 mm. from the bottom of the reactor. The reactor was heated by a small hemispherical Glas-col heating mantle and temperatures given are those shown by the thermocouple contained in the heating mantle.

(b) Perfluoroadipodiamidine, 10.0 gm. (0.0350 mole) and perfluorobutylramidine, 10.0 gm. (0.0472 mole) were placed in the reactor described in 4(a). The temperature, measured as described above, was raised at approximately a uniform rate over a period of 68 minutes to a value of 322° C. At this point the condenser was removed and the pressure reduced in the reactor by connecting to a water aspirator. The temperature was raised to a final value of 344° C. during the next 23 minutes. The reactor was then heated briefly at atmospheric pressure with a free flame to remove volatile material on the upper walls. The condensation product (14.8 gm.) is an elastic, tacky, amber colored solid. It does not melt at 400° C.

(c) Perfluoroadipoliamidine, 10.0 gm. (0.0350 mole) and perfluorobutyramidine, 11.5 gm. (0.0532 mole) were placed in the reactor described in 4(a). Temperature was raised to 318° C. over a period of 84 minutes. Pressure in the reactor was reduced by the water aspirator and the temperature allowed to rise 332° over the next 16 minutes. The liquid product was heated briefly with a free flame at atmospheric pressure, then poured from the reactor. 15.6 gm. of condensation product was recovered. This product is an amber colored gum, extremely viscous and tacky at room temperature. Temperatures in the range of 300–400° C. reduce the viscosity markedly.

(d) Perfluoroglutarimidine, 10.0 gm. (0.0424 mole) and perfluorobutyramidine, 14.38 gm. (0.0677 mole) were placed in the reactor described in 4(a). The temperature was raised to 354° C. over a period of 71 minutes. The condenser was then removed and the pressure reduced by connection to the water aspirator. Temperature was raised to 402° C. over the next ten minutes. The reactor was then heated briefly with a free flame at atmospheric pressure. The recovered condensation product (15.5 gm.) was a transparent, tacky, elastomeric gum. This condensation product softens at 400° C. but does not melt.

(e) Perfluoroglutarimidine, 5.0 gm. (0.021 mole) and perfluolooctanoamidine, 14.0 gm. (0.0339 mole) were placed in the apparatus described in 4(a). The temperature was raised to 386° C. over a period of 78 minutes. The condenser was removed and the reactor was connected to the water aspirator for 10 minutes. The reactor was then heated briefly with a free flame at atmospheric pressure and the condensation product poured from the reactor. This product is a very viscous liquid at room temperature but can be poured easily at 400° C. Yield of condensation product, 12.9 gm.

The homo- and co-condensation may be carried out by direct heating of the condensation monomers as described above or they may be carried out in the presence of a solvent for the monomers. The solvent should be substantially inert as far as reaction with monomers is concerned, its boiling point should be sufficiently high, either under atmospheric pressure or at a reasonable higher pressure, that the activation temperature for the condensation reaction may be reached and yet low enough that the solvent may be removed without difficulty from the polymeric condensation product. Suitable solvents include perfluorotributylamine, pentachloroethane, and liquid C₆ telomers of chlorotrifluoroethylene, such as Kel-F Alkane 695 and Kel-F Polymer Oil-1.

Solution polymerization is particularly advantageous when one or more of the monomer components tends to decompose before melting.

*Example 5.—Solution Copolymerization in Pentachloroethane*

Perfluoroglutarimidine, 5.00 g. (0.0228 mole) and perfluorobutyramidine, 4.49 g. (0.0212 mole), molar ratio 1.00/0.93, and pentachloroethane, 20 ml., were placed in a 50 ml. flask fitted with a reflux condenser. The mixture was heated at the reflux temperature (155–160° C.) of pentachloroethane for 72 hours. At the end of the heating period the solid copolymer which had formed was separated by filtration, washed two times with methylene dichloride and dried under a high vacuum at room temperature for 12 hours. The recovered polymer 7.8 gm., was a light tan, opaque solid that was resilient but not tacky. The polymer still retained a faint odor of pentachloroethane. A portion of this copolymer was heated in the air at a temperature of 350° C. The sample darkened initially, after 46 hours the polymer became white, opaque, and slightly harder than the original material but was still resilient. The weight loss during this heating period which also represents loss of residual solvent was approximately 35%.

*Example 6.—Solution Copolymerization in Kel-F Alkane 695*

Perfluoroglutarimidine, 10.00 g. (0.0457 mole) and perfluorobutyramidine, 10.80 g. (0.0508 mole), a molar ratio of 1.00/1.10, were mixed with 100 ml. of Kel-F Alkane 695 (C₆ telomer of CTFE). This reaction mixture was placed in a 200 ml. 3-neck flask fitted with a reflux condenser, thermometer, and magnetic stirrer. The mixture was heated over a period of 6 hours at 175–180°. At this point ammonia evolution was fairly rapid. A 1 ml. sample was withdrawn from the reaction flask and solvent boiled off to leave a viscous tacky liquid. The temperature of the reaction was then raised to approximately 200° and heating continued for an additional 17 hours at this temperature. The solvent was distilled from the reaction flask (to a pot temperature of 230°) to leave a liquid that is viscous but flows easily at room temperature. This polymer product probably contains residual solvent at this point.

A portion of this copolymer was heated in a 6 inch test tube open to the air at 350° for a total of 32 hours. The rate of weight loss during the last four hours of this heating period was 0.23% per hour. The polymer sample after heating is a dark amber, tacky, stiff gum at room temperature but is a mobile liquid at 350° C.

*Example 7.—Solution Copolymerization in Perfluorotributylamine*

Perfluoroglutarimidine, 10.00 g. (0.0457 mole) and perfluorobutyramidine, 4.50 g. (0.0212 mole), molar ratio 1.00/0.45, and perfluorotributylamine, 100 ml., were placed in a 200 ml. 2-neck flask equipped with a reflux condenser, thermometer and magnetic stirrer. The mixture was heated over a period of one-half hour to a temperature of 145°. At this point, although the monomers had apparently dissolved, the solution was cloudy. Ammonia was evolved rapidly. With an additional 5 minutes heating the temperature rose to 166° and solid formed as a large yellow lump in the reaction mixture. Heating was continued for a total of 15 hours to a maximum temperature of 178°. Evolution of ammonia was very slow at the end of this heating time. Solvent was removed from the reaction mixture by distillation; the solid product was then placed in a furnace at 260° and maintained at this temperature under reduced pressure for 3 hours. The resulting polymer (10.5 g.) was a tan, opaque, granular solid that was not tacky or elastic.

This application is a continuation-in-part of my application Serial No. 731,106, filed April 28, 1958, now abandoned.

I claim:

1. Compounds of the group consisting of perfluoroalkylimidines of the formula

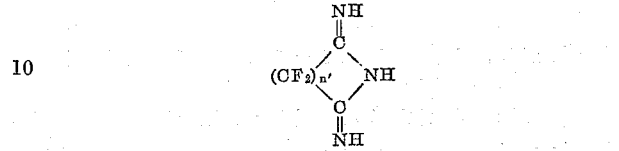

wherein $n'$ is an integer from 1 to 3 and perfluoroalkyldiamidines of the formula $$H_2N(NH:)C(C_{n''}F_{2n''})C(:NH)NH_2$$

wherein $n''$ is an integer from 4 to 10.

2. Perfluoroalkylimidines of the formula

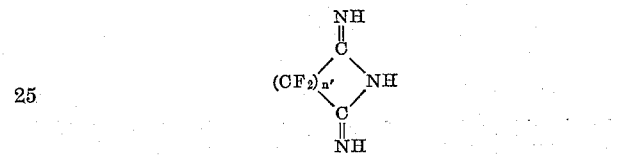

wherein $n'$ is an integer from 1 to 3.

3. Perfluoroalkyldiamidines of the formula $$H_2N(HN:)C(C_{n''}F_{2n''})C(:NH)NH_2$$

wherein $n''$ is an integer from 4 to 10.

4. Perfluoroglutarimidine.

5. Perfluoroadipodiamidine.

6. A condensation product obtained by heating a compound selected from the group consisting of perfluoroalkylimidines of the formula

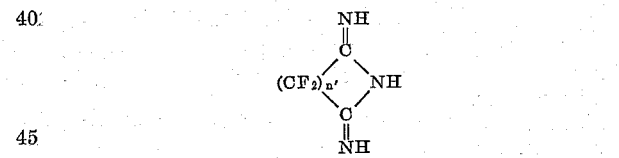

wherein $n'$ is an integer from 1 to 3 and perfluoroalkyldiamidines of the formula $$H_2N(NH:)C(C_{n''}F_{2n''})C(:NH)NH_2$$

wherein $n''$ is an integer from 4 to 10 until the evolution of volatile reaction products substantially ceases.

7. A condensation product obtained by heating a perfluoroalkylimidine of the formula

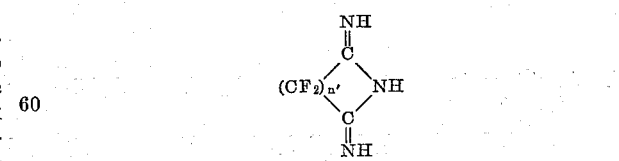

wherein $n'$ is an integer from 1 to 3 until the evolution of volatile reaction products substantially ceases.

8. A condensation product obtained by heating a perfluoroalkyldiamidine of the formula $$H_2N(HN:)C(C_{n''}F_{2n''})C(:NH)NH_2$$

wherein $n''$ is an integer from 4 to 10 until the evolution of volatile reaction products substantially ceases.

9. A condensation product obtained by heating perfluoroadipodiamidine until the evolution of volatile reaction products substantially ceases.

10. A condensation product obtained by heating a mixture of a compound selected from the group consisting of perfluoroalkylimidines of the formula

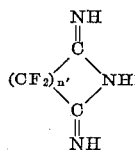

wherein $n'$ is an integer from 1 to 3 and perfluoroalkyldiamidines of the formula $$H_2N(NH:)C(C_{n''}F_{2n''})C(:NH)NH_2$$

wherein $n''$ is an integer from 4 to 10 with a perfluoroalkylmonamidine of the formula $CF_3(CF_2)_nC(:NH)NH_2$ wherein $n$ is an integer from 0 to 10 until the evolution of volatile reaction products substantially ceases.

11. A condensation product obtained by heating a mixture of a perfluorodialkylimidine of the formula

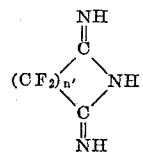

wherein $n'$ is an integer from 1 to 3 with a perfluoroalkylmonamidine of the formula $CF_3(CF_2)_nC(:NH)NH_2$ wherein $n$ is an integer from 0 to 10 until the evolution of volatile reaction products substantially ceases.

12. A condensation product obtained by heating a mixture of a perfluoroalkyldiamidine of the formula $$H_2N(HN:)C(C_{n''}F_{2n''})C(:NH)NH_2$$

wherein $n''$ is an integer from 4 to 10 with a perfluoroalkylmonamidine of the formula $$CF_3(CF_2)_nC(:HN)NH_2$$

wherein $n$ is an integer from 0 to 10 until the evolution of volatile reaction products substantially ceases.

13. A condensation product obtained by heating a mixture of perfluoroadipodiamidine and perfluorobutyramidine until the evolution of volatile reaction products substantially ceases.

14. A condensation product obtained by heating a mixture of perfluoroadipodiamidine and perfluorooctanoamidine until the evolution of a volatile reaction products subtantially ceases.

15. A method of making resinous condensation products which comprises heating a compound selected from the group consisting of perfluoroalkylimidines of the formula

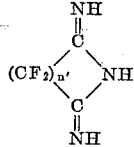

wherein $n'$ is an integer from 1 to 3 and perfluoroalkyldiamidines of the formula $$H_2N(NH:)C(_{n''}F_{2n''})C(:NH)NH_2$$

wherein $n''$ is an integer from 4 to 10 until the evolution of volatile reaction products substantially ceases.

16. A method of making resinous condensation products which comprises heating a perfluoroalkylimidine of the formula

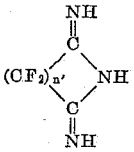

wherein $n'$ is an integer from 1 to 3 until the evolution of volatile reaction products ceases.

17. A method of making resinous condensation products which comprises heating a perfluoroalkyldiamidine of the formula $$H_2N(HN:)C(C_{n''}F_{2n''})C(:NH)NH_2$$

wherein $n''$ is an integer from 4 to 10 until the evolution of volatile reaction products substantially ceases.

18. A method of making resinous condensation products which comprises heating a mixture of a compound selected from the group consisting of perfluoroalkylimidines of the formula

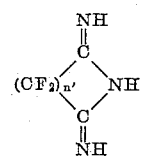

wherein $n'$ is an integer from 1 to 3 and perfluoroalkyldiamidines of the formula $$H_2N(NH:)C(C_{n''}F_{2n''})C(:NH)NH_2$$

wherein $n''$ is an integer from 4 to 10 with a perfluoroalkylmonamidine of the formula $$CF_3(CF_2)_nC(:NH)NH_2$$

wherein $n$ is an integer from 0 to 10 until the evolution of volatile reaction products substantially ceases.

19. A method of making resinous condensation products which comprises heating a mixture of a perfluoroalkylimidine of the formula

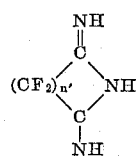

wherein $n'$ is an integer from 1 to 3 with a perfluoroalkylmonamidine of the formula $CF_3(CF_2)_nC(:NH)NH_2$ wherein $n$ is an integer from 0 to 10 until the evolution of volatile reaction products substantially ceases.

20. A method of making resinous condensation products which comprises heating a mixture of a perfluoroalkyldiamidine of the formula $$H_2N(HN:)C(C_{n''}F_{2n''})C(:NH)NH_2$$

wherein $n''$ is an integer from 4 to 10 with a perfluoroalkylmonamidine of the formula $$CF_3(CF_2)_nC(:NH)NH_2$$

wherein $n$ is an integer from 0 to 10 until the evolution of volatile reaction products substantially ceases.

21. A method of making resinous condensation products which comprises heating a perfluoroalkanoyl dinitrile of the general formula $NC(C_nF_{2n})CN$ wherein $n$ is an integer from 1 to 10 in the presence of a condensing agent.

22. A method of making resinous condensation products which comprises heating a perfluoroalkanoyl dinitrile of the general formula $NC(C_nF_{2n})CN$ wherein $n$ is an integer from 1 to 10 in the presence of ammonia.

23. A method of making resinous condensation products which comprises heating a mixture of a perfluoroalkanoyl dinitrile of the general formula $NC(C_nF_{2n})CN$ wherein $n$ is an integer from 1 to 10 and a perfluoroalkanoyl nitrile containing from 1 to 11 carbon atoms in the alkyl group thereof in the presence of a condensing agent.

24. A method of making resinous condensation products which comprises heating a mixture of a perfluoroalkanoyl dinitrile of the general formula $NC(C_nF_{2n})CN$ wherein $n$ is an integer from 1 to 10 and a perfluoroalkanoyl nitrile containing from 1 to 11 carbon atoms in the alkyl group thereof in the presence of ammonia.

25. Resinous condensation products comprising essentially crosslinked chains of the structure
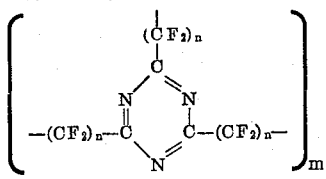
wherein $n$ is an integer from 1 to 10 and $m$ is an integer greater than 1.
References Cited in the file of this patent
UNITED STATES PATENTS
| 2,515,246 | McBee et al. | July 8, 1950 |
| 2,676,985 | Husted | Apr. 27, 1954 |
| 2,788,362 | Barnhardt et al. | Apr. 9, 1956 |
FOREIGN PATENTS
| 689,425 | Great Britain | Mar. 25, 1953 |
| 717,232 | Great Britain | Oct. 27, 1954 |